United States Patent

Listemann et al.

[11] Patent Number: 5,539,007
[45] Date of Patent: Jul. 23, 1996

[54] CATALYST COMPOSITIONS FOR MAKING POLYURETHANE BASED ON IMIDAZOLES AND BORON COMPOUNDS

[75] Inventors: Mark L. Listemann, Whitehall; Lisa A. Mercando, Pennsburg; Ann C. L. Savoca, Bornville, all of Pa.

[73] Assignee: Air Products and Chemicals, Inc., Allentown, Pa.

[21] Appl. No.: 474,036

[22] Filed: Jun. 7, 1995

Related U.S. Application Data

[63] Continuation-in-part of Ser. No. 298,629, Aug. 31, 1994, abandoned.

[51] Int. Cl.$^6$ .............................. C08J 9/08; C08G 18/20
[52] U.S. Cl. ........................ 521/103; 521/105; 521/115; 521/116; 521/118; 521/129; 521/166; 521/170
[58] Field of Search ...................... 521/103, 105, 521/118, 129, 166, 170, 115, 116

[56] References Cited

U.S. PATENT DOCUMENTS

| | | | |
|---|---|---|---|
| 3,127,404 | 3/1964 | Mascioli | 544/229 |
| 3,193,515 | 7/1965 | Mascioli | 521/105 |
| 3,448,065 | 6/1969 | Green | 521/118 |
| 4,026,840 | 5/1977 | Bechara et al. | 521/118 |
| 4,425,444 | 1/1984 | White | 521/105 |
| 4,530,938 | 7/1985 | White | 521/105 |
| 4,611,013 | 9/1986 | Ashida | 521/105 |
| 4,857,560 | 8/1989 | Schmidt et al. | 521/103 |
| 5,086,081 | 2/1992 | Savoca | 521/103 |
| 5,162,379 | 11/1992 | Savoca et al. | 521/103.5 |
| 5,166,223 | 11/1992 | Savoca et al. | 521/103 |
| 5,236,964 | 8/1993 | Savoca et al. | 521/105 |
| 5,238,894 | 8/1993 | Savoca et al. | 502/167 |

FOREIGN PATENT DOCUMENTS

| | | |
|---|---|---|
| 671012 | 10/1964 | Belgium . |
| 2301554 | 9/1976 | France . |
| 1153308 | 5/1969 | United Kingdom . |

OTHER PUBLICATIONS

Koehler, Jackson, Lienhard "A Search for the Addition of Monoentate Nucleophiles to Boric and Benzeneboronic Acids in Water" J. Org. Chem., vol. 37, No. 14, 1972.

CA 99 (6) 39229a.

Primary Examiner—James J. Seidleck
Assistant Examiner—Rabon Sergent
Attorney, Agent, or Firm—Michael Leach; William F. Marsh

[57] ABSTRACT

A method for catalyzing the blowing reaction and making polyurethane foams employing a catalyst composition consisting essentially of a hydroxy-functional imidazole of the following formula I

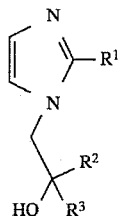

where $R^1$ is a $C_1$–$C_{10}$ alkyl; $R^2$ is hydrogen, methyl or ethyl and $R^3$ is hydrogen or a $C_1$–$C_{20}$ organic group optionally having an ether functionality, provided that when $R^1$ is methyl, $R^2$ and $R^3$ are not both hydrogen or a hydrogen and a methyl, in combination with a boron compound of the formula $$R_nB(OH)_{3-n}$$

where n=0 or 1, and R=$C_1$–$C_8$ alkyl, $C_5$–$C_8$ cycloalkyl, or $C_6$–$C_{10}$ aryl.

13 Claims, No Drawings

CATALYST COMPOSITIONS FOR MAKING POLYURETHANE BASED ON IMIDAZOLES AND BORON COMPOUNDS

CROSS-REFERENCE TO RELATED APPLICATIONS

This application is a continuation-in-part of application Ser. No. 08/298,629 filed 31 Aug. 1994 now abandoned.

TECHNICAL FIELD

The present invention relates to the use of N-hydroxyalkyl imidazole compounds as catalysts for producing polyurethane products.

BACKGROUND OF THE INVENTION

Polyurethane foams are widely known and used in automotive, housing and other industries. Foam is generally referred to as rigid, microcellular, or flexible. The commercial production of polyurethanes via isocyanate polyaddition reactions requires the use of catalysts. Tertiary amines are widely accepted in the industry as versatile polyurethane catalysts. They are generally stable in the presence of standard polyurethane formulation components and can impact both the blowing (water-isocyanate) and gelling (polyol-isocyanate) reactions. Unfortunately, a number of commonly used tertiary amine catalysts are relatively volatile due to low molecular weight and are malodorous and offensive. Release of tertiary amine during foam processing may present significant safety and toxicity problems, and release of residual amines from consumer products is generally undesirable. Therefore, identifying alternatives to standard tertiary amine catalysts which are not malodorous, yet exhibit the same type of activity in isocyanate polyaddition reactions would be desirable.

One strategy for the reduction of odor associated with tertiary amine catalysts is the identification of less volatile structures. The prior art teaches numerous techniques for reducing volatility, particularly increasing molecular weight or improving hydrogen bonding capability. Amine catalysts which contain primary and/or secondary hydroxyl functionality typically have limited volatility and low odor when compared to related structures which lack this functionality. Furthermore, catalysts which contain hydroxyl functionality chemically bond into the urethane during the reaction and are not released from the finished product. Catalyst structures which embody this concept are typically of low to moderate activity and are designed to promote the blowing reaction.

U.S. Pat. No. 4,026,840 discloses the use of hydroxy-functionalized tertiary amines as polyurethane catalysts, particularly useful for the production of polyisocyanurate.

G.B. 1,153,308 discloses polyurethane foam compositions containing N-hydroxyalkyl substituted imidazoles used as gelling catalysts.

BE 671,012 discloses the use of 1,2-disubstituted imidazoles, preferably 1,2-dimethylimidazole, 1-(2-hydroxyethyl)-2-methyl-imidazole and 1-(2-hydroxypropyl)-2-methylimidazole in polyester polyol based rigid, semi-rigid, or flexible foams based on toluene diisocyanate (TDI) and 4,4'-diphenylmethane diisocyanate (MDI).

U.S. Pat. No. 4,857,560 discloses reduced odor emission as an additional advantage of catalysts formed from the reaction of tertiary amines and an acid mixture of 1) boric acid and 2) a carboxylic acid.

U.S. Pat. No. 5,238,894 discloses hydroxyl-containing amine-boron adducts as reduced odor compositions for the production of polyurethanes. The catalysts consist essentially of a hydroxyl-containing tertiary amine urethane catalyst and a boron compound of the formula $R_nB(OH)_{3-n}$ where n=0 or 1. However, boric acid derivatives were not used in combination with hydroxy-functional imidazole compounds. In addition, the use of boron compounds as a way to alter the blow/gel selectivity of the catalyst was not discussed.

CA 99(6):39229a notes that boric acid, when used as a filler at 10–40%, decelerates foaming in polyurethanes based on Laprol 805 and Lapramol 294 polyether polyols, polyisocyanate, Freon 113 blowing agent and water. "Int. Prog. Urethanes 1980", 2, 153–73 describes the use of boric acid as a blowing agent, its behavior being almost equal to that of water. Neither reference describes the effect of boric acid at use levels typified by a catalyst, nor do they indicate the effect of boric acid on polyurethane catalysis in the presence of a tertiary amine.

U.S. Pat. No. 4,611,013 describes the use of quarternary ammonium borates to effect the concurrent trimerization/carbodiimidization of polyisocyanates. The borates are prepared from boric acid, alcohols and quarternary ammonium hydroxides and as such are not derived form tertiary amines. Other examples are given by U.S. Pat. No. 4,530,938 and 4,425,444.

U.S. Pat. No. 3,193,515; U.S. Pat. No. 3,127,404 and FR 2,301,554 disclose the use of boric acid in the preparation of an ammonium salt polyurethane catalyst from triethylenediamine and a glycol borate acid.

"J. Org. Chem." 1972, 37 (14), 2232 discloses that monodentate nitrogen nucleophiles do not react significantly with boric acid in aqueous solution.

SUMMARY OF THE INVENTION

The present invention provides a composition for catalyzing the blowing reaction of water with isocyanate to release carbon dioxide for making foamed polyurethanes. The catalyst composition consists essentially of hydroxy-functional imidazoles in combination with a boron compound of the formula

where n=0 or 1, and R=$C_1$–$C_8$ alkyl, $C_5$–$C_8$ cycloalkyl, or $C_6$–$C_{10}$ aryl. The hydroxy-functional imidazoles are represented by the following formula I:

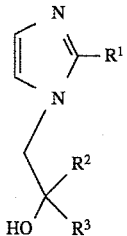

Formula I where $R^1$ is a $C_1$–$C_{10}$ alkyl; $R^2$ is hydrogen, methyl or ethyl, and $R^3$ is hydrogen or a $C_1$–$C_{20}$ organic group which may contain ether functionality, such as, for example methyl, ethyl, phenyl, $C_2$–$C_{18}$ alkoxy which may contain hydroxyl functionality, provided that when $R^1$ is methyl, $R^2$ and $R^3$ are not both hydrogen or a hydrogen and a methyl. The imidazoles in which $R^1$ is ethyl, $R^2$ is methyl and $R^3$ is hydrogen or methyl are the preferred compounds.

As an advantage of these catalyst compositions there is a significant change in the selectivity of the hydroxy functional imidazoles upon the addition of boron compounds. Specifically, the boron compound alters the selectivity of these hydroxy-functional imidazoles toward the blowing reaction.

DETAILED DESCRIPTION OF THE INVENTION

The catalyst compositions according to the invention can catalyze the reaction between an isocyanate functionality and an active hydrogen-containing compound, i.e., an alcohol, an amine or water, especially the urethane (gelling) reaction to make polyurethanes and the blowing reaction of water with isocyanate to release carbon dioxide for making foamed polyurethanes, or the trimerization of the isocyanate functionality to form polyisocyanurates.

The polyurethane products are prepared using suitable organic polyisocyanates well known in the art including, for example, hexamethylene diisocyanate, phenylene diisocyanate, toluene diisocyanate (TDI) and 4,4'-diphenylmethane diisocyanate (MDI). Especially suitable are the 2,4- and 2,6-TDIs individually or together as their commercially available mixtures. Other suitable isocyanates are mixtures of diisocyanates known commercially as "crude MDI", also known as PAPI, which contain about 60% of 4,4'-diphenylmethane diisocyanate along with other isomeric and analogous higher polyisocyanates. Also suitable are "prepolymers" of these polyisocyanates comprising a partially prereacted mixture of polyisocyanates and polyether or polyester polyols.

Illustrative of suitable polyols as a component of the polyurethane composition are the polyalkylene ether and polyester polyols. The polyalkylene ether polyols include the poly(alkylene oxide) polymers such as poly(ethylene oxide) and poly(propylene oxide) polymers and copolymers with terminal hydroxyl groups derived from polyhydric compounds, including diols and triols; for example, among others, ethylene glycol, propylene glycol, 1,3-butane diol, 1,4-butane diol, 1,6-hexane diol, neopentyl glycol, diethylene glycol, dipropylene glycol, pentaerythritol, glycerol, diglycerol, trimethylol propane and like low molecular weight polyols.

In the practice of this invention, a single high molecular weight polyether polyol may be used. Also, mixtures of high molecular weight polyether polyols such as mixtures of di- and trifunctional materials and/or different molecular weight or different chemical composition materials may be used.

Useful polyester polyols include those produced by reacting a dicarboxylic acid with an excess of a diol, for example, adipic acid with ethylene glycol or butanediol, or reacting a lactone with an excess of a diol such as reacting caprolactone with propylene glycol.

In addition to the polyether and polyester polyols, the masterbatches, or premix compositions, frequently contain a polymer polyol. Polymer polyols are used in polyurethane foam to increase the foam's resistance to deformation, i.e. to increase the load-bearing properties of the foam. Currently, two different types of polymer polyols are used to achieve load-bearing improvement. The first type, described as a graft polyol, consists of a triol on which vinyl monomers are graft copolymerized. Styrene and acrylonitrile are the usual monomers of choice. The second type, polyurea modified polyols, is a polyol containing a polyurea dispersion formed by the reaction of a diamine and TDI. Since TDI is used in excess, some of the TDI may react with both the polyol and polyurea. This second type of polymer polyol has a variant called PIPA polyol which is formed by the in-situ polymerization of TDI and alkanolamine in the polyol. Depending on the load-bearing requirements, polymer polyols may comprise 20–80% of the polyol portion of the masterbatch.

Other typical agents found in the polyurethane foam formulations include crosslinkers such as ethylene glycol, butanediol, diethanolamine, diisopropanolamine, triethanolamine and/or tripropanolamine; blowing agents such as water, methylene chloride, trichlorofluoromethane and the like; and cell stabilizers such as silicones.

A general polyurethane flexible foam formulation containing the catalyst composition according to the invention would comprise the following components in parts by weight (pbw):

| Flexible Foam Formulation | |
|---|---|
| Component | Parts by Weight |
| Polyol | 20–80 |
| Polymer Polyol | 80–20 |
| Silicone Surfactant | 1–2.5 |
| Blowing Agent | 2–4.5 |
| Crosslinker | 0.5–2 |
| Catalyst | 0.5–2 |
| Isocyanate Index | 92–115 |

The urethane catalyst composition consists essentially of the addition product, or adduct, of a 1-hydroxyalkyl-2-alkylimidazole and a boron compound of the general formula $$R_nB(OH)_{3-n}$$

where n=0 or 1, and R=$C_1$–$C_8$ alkyl, $C_5$–$C_8$ cycloalkyl, or $C_6$–$C_{10}$ aryl.

Alkyl groups for the boron compound would include, for example, methyl, ethyl, butyl, 2-ethylhexyl and the like; cycloalkyl would include, for example, cyclopentyl, cyclohexyl and the like; and aryl groups would include, for example, phenyl, p-tolyl and the like.

Exemplary of suitable boron compounds are boric acid, phenylboronic acid and isopropylboronic acid. The preferred boron compound is boric acid where n is 0. Contemplated as functional equivalents to boric acid for purposes of this invention are the borate esters, i.e., alkyl—, dialkyl— and trialkylborates in which the alkoxy groups hydrolyze to the hydroxyl functionality in the presence of water. The hydroxy-functional imidazoles are represented by the following formula I:

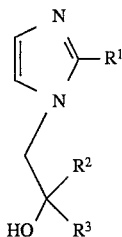

Formula I where $R^1$ is alkyl having 1 to 10 carbons, preferably methyl or ethyl; $R^2$ is hydrogen, methyl or ethyl and $R^3$ is hydrogen or a $C_1$–$C_{20}$ organic group, preferably methyl or ethyl, provided that when $R^1$ is methyl, both $R^2$ and $R^3$ are not both hydrogen or a hydrogen and a methyl. This proviso excludes 1-(2-hydroxyethyl)-2-methylimidazole and 1-(2-hydroxypropyl)-2-methylimidazole. The compositions where $R^1$ is ethyl, $R^2$ is methyl and $R^3$ is hydrogen or methyl are preferred, namely, 1-(2-hydroxypropyl)-2-ethylimidazole and 1-(2-hydroxy-2-methylpropyl)- 2-ethylimidazole The imidazole compounds may be prepared by reacting the appropriate 2-alkylimidazole with a $C_2$–$C_{22}$ reactive epoxide including the simple monoepoxides such as ethylene oxide, propylene oxide, butylene oxide, styrene oxide and the like; glycidyl ethers including those of $C_{12}$–$C_{18}$ higher alcohols such as lauryl, myristyl, cetyl, and stearyl alcohols, simple $C_2$–$C_{18}$ glycols or bisphenols; and epoxidized olefins such as Poly bd 600 and 605 from Atochem or epoxidized vegetable oils. It is preferred to use propylene oxide or butylene oxide.

The 2-alkylimidazoles are commercially available from BASF AG or can be prepared according to U.S. Pat. No. 3,037,028. The epoxide and the 2-alkylimidazole may be reacted in an organic solvent or water. The reaction is typically clean and quantitative and the product does not generally require purification.

Typical molar ratios of imidazole to boron in making the catalyst composition are from 1:0.01 to 1:100, preferably 1:0.1 to 1:10, most preferably 1:0.5 to 1:2.

The adducts of the imidazole and boron compounds are generally easily handled solids which are prepared by precipitation from appropriate solvents upon mixing the imidazole with the boron compound at temperatures from ambient (or lower) to about 50° C., i.e., without substantial heating, and any convenient pressure, especially atmospheric pressure. For example, 1-(2-hydroxypropyl)-2-ethylimidazole and boric acid are blended in water at room temperature to yield, an aqueous solution of the adduct. In addition, solid adducts are afforded upon mixing the imidazole and boric acid in a non-solvent for the adduct, again without the need for substantial heating.

The hydroxy-functional imidazole-boron adducts are easily prepared and more conveniently delivered as solutions in carriers such as water, alcohols, polyols, amines, polyamines, ethers, hydrocarbons and chlorinated hydrocarbons. The preferred carriers are water, alcohols and polyols. The more preferred carriers are standard polyurethane additives such as water, crosslinkers (e.g., diethanolamine), chain extenders (e.g., butanediol), and higher molecular weight polyether and polyester polyols. The boron compound can be delivered into the foam formulation separately from the imidazole catalyst also and still produce equivalent catalyst selectivity and activity.

A catalytically effective amount of the catalyst composition is used in the polyurethane formulation. More specifically, suitable amounts of the catalyst composition may range from about 0.01 to 10 parts, preferably 0.1 to 2 parts, per 100 parts polyol in the polyurethane formulation.

The catalyst compositions may be used in combination with other tertiary amine urethane catalysts and organotin urethane catalysts well known in the urethane art.

As an advantage of these catalyst compositions there is a significant change in the selectivity of the hydroxy-functional imidazoles upon the addition of boron compounds. Specifically, the boron compound alters the selectivity of these hydroxy-functional imidazoles toward the blowing reaction. Thus, these catalyst compositions have the advantage of performing as blowing catalysts.

In the following Example 9, a polyurethane foam was prepared in a conventional manner. The polyurethane formulation in weight parts comprised the following components:

| Component | Parts |
| --- | --- |
| E-648 Polyol | 60 |
| E-519 Polyol | 40 |
| Water | 3.5 |
| Diethanolamine | 1.49 |
| DC 5043 | 1.5 |
| Catalyst | as indicated |
| TDI 80 | 105 index |

E-648 Polyol - ethylene oxide tipped, conventional polyether polyol marketed by Arco Chemical.
E-519 Polyol - styrene-acetonitrile filled, ethylene oxide tipped polyether polyol marketed by Arco Chemical.
DABCO® DC 5043 silicone surfactant marketed by Air Products and Chemicals, Inc.

EXAMPLE 1

Propoxylation of 2-Ethylimidazole

2-Ethylimidazole (9.36 g; 97.4 mmole) was dissolved in 35 mL of methanol and refluxed while stirring. Propylene oxide (8.5 g; 146 mmole) was added dropwise subsurface using a syringe pump. The reaction was monitored by GC. The 2-ethylimidazole conversion was quantitative. The methanol was removed under reduced pressure and the product, 1-(2-hydroxypropyl)-2-ethylimidazole (where $R^1$=Et, $R^2$=Me and $R^3$=H), was then tested as described in Example 9 and Example 10.

EXAMPLE 2

Addition of Boric Acid to Propoxylated 2-Ethylimidazole

A 1:2 molar mixture of Example 1 catalyst and boric acid was prepared. Propoxylated 2-ethylimidazole (1.10 g), boric acid (0.88 g), and water (3.80 g) were combined and dissolved at room temperature over 30 min. The resulting solution was then tested as described in Example 9 and Example 10.

EXAMPLE 3

Addition of Isobutylene Oxide to 2-Ethylimidazole

2-Ethylimidazole (8.6 g; 89.5 mmole) was dissolved in 35 mL of methanol and refluxed while stirring. Isobutylene oxide (6.8 g; 94.4 mmole) was added dropwise subsurface using a syringe pump. The reaction was monitored by GC. The 2-ethylimidazole conversion was quantitative. The solvent was removed under reduced pressure and the product, 1-(2-hydroxy-2-methylpropyl)-2-ethylimidazole (where $R^1$=Et and $R^2$=$R^3$=Me), was then tested as described in Example 10.

EXAMPLE 4

Addition of Boric Acid to Example 3 Catalyst

A 1:2 molar mixture of Example 3 catalyst and boric acid was prepared. Example 3 catalyst (1.18 g), boric acid (0.87 g), and water (3.80 g) were combined and dissolved at room temperature over 30 min. The resulting solution was then tested as described in Example 10.

EXAMPLE 5

Propoxylation of 2-Methylimidazole

2-Methylimidazole (35.5 g; 432.4 mmole) was dissolved in 70 mL of acetonitrile and heated to 60° C. with stirring. Propylene oxide (25.1 g; 432.4 mmole) was added dropwise subsurface using a syringe pump while maintaining the temperature between 60 and 64° C. The reaction was monitored by GC. The 2-methylimidazole conversion was quantitative. The acetonitrile was removed under reduced pressure and the product, 1-(2-hydroxypropyl)-2-methylimidazole (where $R^1=R^2=Me$ and $R^3=H$), was then tested as described in Example 10.

EXAMPLE 6

Addition of Boric Acid to Propoxylated 2-Methylimidazole

A 1:2 molar mixture of Example 5 catalyst and boric acid was prepared. Propoxylated 2-methylimidazole (1.56 g), boric acid (0.88 g), and water (3.80 g) were combined and dissolved at room temperature over 30 min. The resulting solution was then tested as described in Example 10.

EXAMPLE 7

Addition of Isobutylene Oxide to 2-Methylimidazole

2-Methylimidazole (9.0 g; 10.96 mmole) was dissolved in 35 mL of methanol and refluxed while stirring. Isobutylene oxide (8.0 g; 11.11 mmole) was added dropwise subsurface using a syringe pump. The reaction was monitored by GC. The 2-methylimidazole conversion was quantitative. The solvent was removed under reduced pressure and the product, 1-(2-hydroxy-2-methylpropyl)-2-methylimidazole (where $R^1=R^2=R^3=Me$), was then tested as described in Example 10.

EXAMPLE 8

Addition of Boric Acid to Example 7 Catalyst

A 1:2 molar mixture of Example 7 catalyst [1-(2-hydroxy-2-methylpropyl)-2-methylimidazole] and boric acid was prepared according to the following procedure. Example 7 catalyst (2.41 g; 15.6 mmole), boric acid (2.41 g; 31.3 mmole), and water (5.77 g) were combined and dissolved at low heat over 30 minutes. The resulting solution was then tested as described in Example 10.

EXAMPLE 9

The foam reactivity was measured using triethylenediamine (TEDA)/boric acid catalyst as the sole catalyst, and TEDA/boric acid or DABCO 33 LV® catalyst (33 wt% TEDA in dipropylene glycol) as the gelling catalyst and DABCO® BL-11 catalyst (70 wt% bisdimethyl-aminoethyl ether [BDMAEE]), Example 1 catalyst or Example 2 catalyst as the blowing catalyst. Table 1 sets forth conditions and results.

Times cited were from mixing of the polyol masterbatch with isocyanate. Top Of Cup 1 (TOC 1) represents the time required for the foam formulation to fill a 16 oz cup and is an indication of reaction initiation. Top Of Cup 2 represents the time required for the foam formulation to fill a 1 gal cup in addition to the 16 oz cup mentioned above and is an indication of reaction progression. String Gel and Full Rise are further measures of reaction progression and provide some indication of extent of cure.

The advantage of Example 2 catalyst is that it provides a slight initial delay and matches reactivity to the Catalyst A/BL-11 foam (second column), which uses industrial standard catalysts. Example 2 catalyst is then incorporated into the polymer and volatile emissions from the final product will not increase. Table 1 also demonstrates that boric acid may be added along with propoxylated 2-ethylimidazole to the foam formulation, as illustrated in "Run 1A" column and "33-LV/Ex 2 cat" column or separately from the imidazole catalyst as shown in "Cat A/Ex 1 cat" column in Table 1.

TABLE 1

|  | Cat A/ BL-11 | Cat A | Cat A/ Ex 1 cat | Run 1A | 33-LV/ Ex 2 cat |
| --- | --- | --- | --- | --- | --- |
| Catalyst (pphp) | 0.69/0.15 | 1.38 | 0.69/0.29 | 1.63 | 0.5/1.52 |
| Active Catalyst (pphp) | 0.17/0.11 | 0.34 | 0.17/0.29 | 0.46 | 0.17/0.29 |
| TOC 1 (s) | 8.62 | 11.02 | 10.61 | 10.51 | 10.44 |
| TOC 2 (s) | 22.49 | 27.98 | 28.33 | 27.95 | 27.66 |
| Gel (s) | 28.49 | 34.72 | 33.11 | 32.77 | 31.70 |
| Rise (s) | 63.97 | 66.07 | 71.11 | 72.43 | 70.72 |
| Height (mm) | 430.61 | 430.81 | 427.78 | 428.92 | 429.25 |
| Final Height (mm) | 398.28 | 405.00 | 399.55 | 401.76 | 401.53 |

Ex 1 cat: Propoxylated 2-ethylimidazole
Ex 2 cat: 1:2 Propoxylated 2-ethylimidazole/boric acid
Cat A: 50% 1:2 TEDA/Boric acid, 50% Water (See U.S. 5,130,403)
Run 1A: Cat A and Ex 1 cat mixed together before adding to formulation

EXAMPLE 10

Example 10 demonstrates the activity and selectivity of the different hydroxy-functional imidazole/boron compositions. The rate of isocyanate consumption as a function of time was measured using a formulation similar to that of Example 9, but containing monofunctional reactants. Reaction samples drawn at the indicated times were quenched with dibutylamine and analyzed by liquid chromatography. Catalyst selectivity is defined as the ratio of the rate of blowing (urea formation) to the rate of gelling (urethane formation). A selectivity of one means that the rates of blowing and gelling are equal at that point in the reaction. A selectivity substantially below one; for example about 0.3, is indicative of a strong gelling catalyst. A selectivity greater than one is indicative of a blowing catalyst. Table 2 sets forth the results.

Table 2 illustrates that TEDA, an industry standard gelling catalyst, exhibits a selectivity of 0.30 at 0.5 min, and that DABCO BL-19 catalyst (BDMAEE), an industry standard blowing catalyst, has a selectivity of 1.30 at 0.5 min. The selectivity of TEDA upon the addition of boric acid, as indicated in the second row of Table 2, basically remains unchanged. However, comparison of Example 1 catalyst to Example 2 catalyst indicates the latter to be more selective for blowing. Example 2 catalyst is the Example 1 catalyst with boric acid added. Example 4 catalyst is much more selective for blowing than Example 3 catalyst. Example 4 catalyst is the Example 3 catalyst with boric acid added. These results are unexpected when compared to Example 5 catalyst and Example 6 catalyst. The addition of boric acid to Example 5 catalyst does not affect the selectivity of the catalyst. It is not expected that hydroxyalkyl imidazole/boron derivatives would have such different performance.

TABLE 2

| Catalyst | | Time (min) | | | | | | |
|---|---|---|---|---|---|---|---|---|
| | | 0.5 | 1.0 | 1.5 | 2.0 | 3.0 | 4.0 | 6.0 |
| TEDA | Selectivity | 0.30 | 0.35 | 0.45 | 0.50 | 0.61 | 0.69 | 0.73 |
| | % NCO Conversion | 14.2 | 28.9 | 44.0 | 50.3 | 64.1 | 71.6 | 79.9 |
| TEDA/ | Selectivity | 0.30 | 0.38 | 0.45 | 0.52 | 0.64 | 0.68 | 0.70 |
| Boric acid (1:2) | % NCO Conversion | 18.1 | 33.7 | 44.4 | 53.8 | 65.2 | 71.7 | 76.4 |
| BDMAEE | Selectivity | 1.30 | 1.31 | 1.22 | 1.16 | 1.07 | 1.01 | 0.96 |
| | % NCO Conversion | 17.7 | 29.9 | 40.8 | 49.3 | 61.8 | 69.9 | 78.0 |
| Ex 1 | Selectivity | 0.57 | 0.64 | 0.68 | 0.57 | 0.58 | 0.65 | 0.77 |
| | % NCO Conversion | 11.7 | 26.3 | 46.3 | 72.9 | 89.7 | 90.7 | 92.8 |
| Ex 2 | Selectivity | 0.94 | 1.29 | 1.37 | 1.35 | 1.19 | 1.06 | 1.01 |
| | % NCO Conversion | 15.7 | 47.0 | 66.0 | 72.2 | 77.2 | 80.3 | 84.7 |
| Ex 3 | Selectivity | 0.61 | 0.75 | 0.66 | 0.62 | 0.71 | 0.78 | 0.83 |
| | % NCO Conversion | 17.7 | 46.7 | 79.9 | 90.2 | 91.6 | 92.8 | 94.3 |
| Ex 4 | Selectivity | 1.07 | 1.61 | 1.55 | 1.44 | 1.29 | 1.22 | 1.12 |
| | % NCO Conversion | 22.1 | 58.4 | 72.8 | 77.4 | 81.0 | 83.4 | 87.2 |
| Ex 5 | Selectivity | 0.33 | 0.38 | 0.41 | 0.45 | 0.53 | 0.58 | 0.64 |
| | % NCO Conversion | 11.3 | 23.6 | 33.4 | 40.9 | 53.6 | 60.9 | 69.2 |
| Ex 6 | Selectivity | 0.35 | 0.39 | 0.43 | 0.46 | 0.53 | 0.59 | 0.66 |
| | % NCO Conversion | 11.1 | 23.8 | 31.8 | 38.9 | 50.3 | 58.4 | 67.4 |
| Ex 7 | Selectivity | 0.62 | 0.71 | 0.71 | 0.70 | 0.71 | 0.70 | 0.69 |
| | % NCO Conversion | 19.9 | 45.0 | 66.5 | 77.6 | 81.9 | 83.6 | 85.5 |
| Ex 8 | Selectivity | 0.70 | 1.26 | 1.42 | 1.33 | 1.21 | 1.11 | 1.06 |
| | % NCO Conversion | 16.5 | 50.6 | 71.7 | 77.4 | 81.7 | 83.8 | 86.4 |

The prior art does not indicate that boron compounds can be added to hydroxy-functional imidazole catalysts for the purpose of altering the selectivity of the catalyst towards blowing. The present invention combines boron compounds with hydroxy-functional imidazoles to afford blowing catalysts which have low volatility and are furthermore prevented from release from the finished foam product through chemical reaction with the foam itself.

STATEMENT OF INDUSTRIAL APPLICATION

The present invention provides imidazole compositions for catalyzing the isocyanate trimerization reaction, the gelling (polyol-isocyanate) reaction and especially the blowing (water-isocyanate) reaction and preparing urethane products, especially polyurethane foam products.

We claim:

1. In a method for preparing a polyurethane foam which comprises reacting an organic polyisocyanate and a polyol in the presence of a blowing agent comprising water, a cell stabilizer and a catalyst composition, the improvement which comprises employing a catalyst composition consisting essentially of a hydroxy-functional imidazole of the following formula I

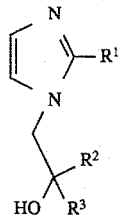

where $R^1$ is a $C_1$–$C_{10}$ alkyl; $R^2$ is hydrogen, methyl or ethyl and $R^3$ is hydrogen or a $C_1$–$C_{20}$ organic group optionally containing an ether group provided that when $R^1$ is methyl, $R^2$ and $R^3$ are not both hydrogen or a hydrogen and a methyl, in combination with a boron compound of the formula $$R_nB(OH)_{3-n}$$

where n=0 or 1, and R=$C_1$–$C_8$ alkyl, $C_5$–$C_8$ cycloalkyl, or $C_6$–$C_{10}$ aryl.

2. The method of claim 1 in which the boron compound is boric acid, phenylboronic acid or isopropylboronic acid.

3. The method of claim 1 in which the boron compound is boric acid.

4. The method of claim 3 in which $R^2$ is methyl or ethyl.

5. The method of claim 3 in which $R^3$ is hydrogen, methyl or ethyl.

6. The method of claim 3 in which $R^1$ is methyl or ethyl.

7. The method of claim 1 in which $R^1$ is methyl or ethyl.

8. The method of claim 1 in which $R^2$ is methyl or ethyl.

9. The method of claim 1 in which $R^3$ is hydrogen, methyl or ethyl.

10. In a method for preparing a polyurethane foam which comprises reacting an organic polyisocyanate and a polyol in the presence of a blowing agent comprising water, a cell stabilizer and a catalyst composition, the improvement which comprises employing a catalyst composition consisting essentially of a hydroxy-functional imidazole of the following formula I

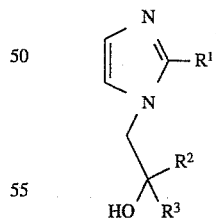

where $R^1$ is methyl or ethyl; $R^2$ is methyl and $R^3$ is hydrogen or methyl, provided that when $R^1$ is methyl, $R^3$ is not hydrogen, in combination with boric acid.

11. The method of claim 10 in which $R^1$ is ethyl, $R^2$ is methyl and $R^3$ is hydrogen.

12. The method of claim 10 in which $R^1$ is ethyl and $R^2$ and $R^3$ are methyl.

13. The method of claim 10 in which $R^1$, $R^2$ and $R^3$ are methyl.

* * * * *